(No Model.)
A. WHITLEY.
COTTON CHOPPER AND SCRAPER.
No. 459,324. Patented Sept. 8, 1891.
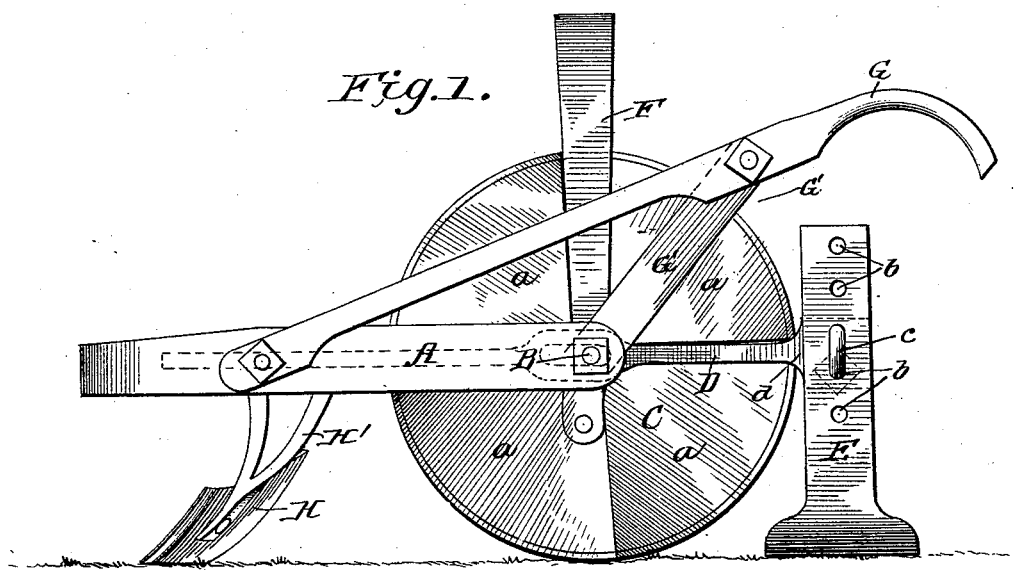
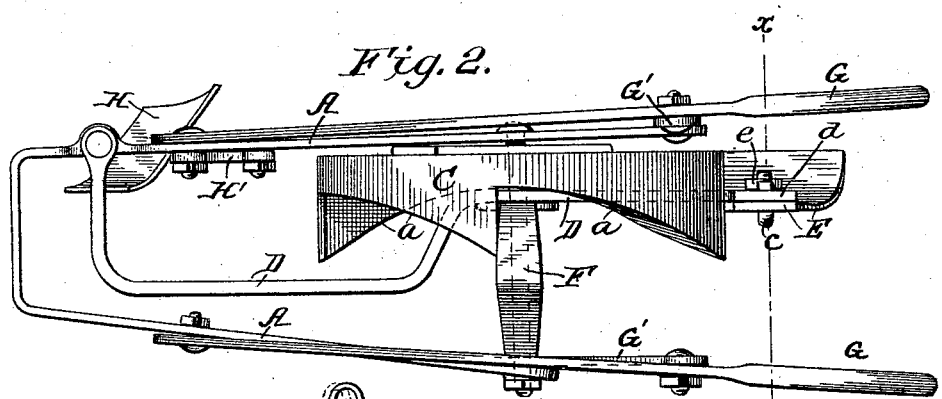
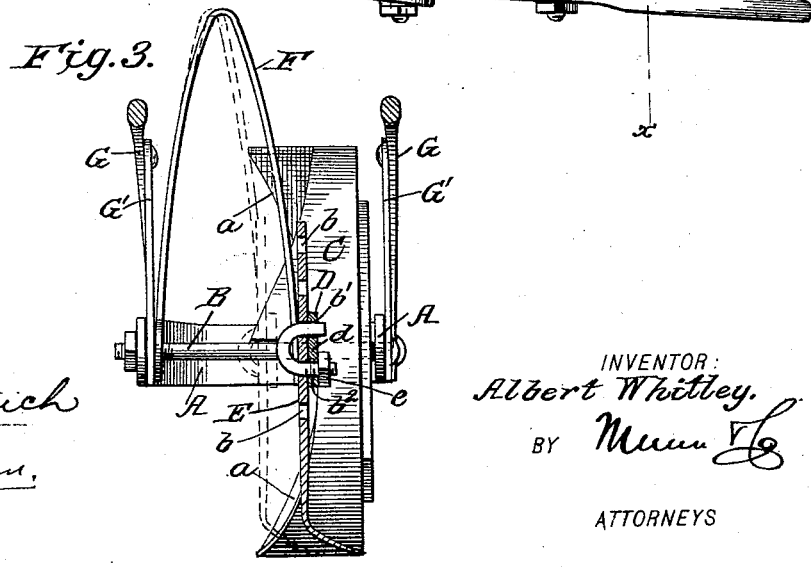
WITNESSES:
Fred G. Dieterich
Edw. W. Byrn
INVENTOR:
Albert Whitley.
BY Munn & Co.
ATTORNEYS

UNITED STATES PATENT OFFICE.

ALBERT WHITLEY, OF WOODVILLE, MISSISSIPPI.

COTTON CHOPPER AND SCRAPER.

SPECIFICATION forming part of Letters Patent No. 459,324, dated September 8, 1891.

Application filed April 9, 1891. Serial No. 388,331. (No model.)

*To all whom it may concern:*

Be it known that I, ALBERT WHITLEY, of Woodville, in the county of Wilkinson and State of Mississippi, have invented a new and useful Improvement in a Cotton Chopper and Scraper, of which the following is a specification.

My invention is in the nature of an improved cotton chopper and scraper designed to scrape the edge of a row of cotton-plants and to chop out the row at intervals, so as to convert the continuous row into a series of hills.

It consists in the peculiar construction and arrangement of the cotton chopper and scraper, which I will now proceed to fully describe with reference to the drawings, in which—

Figure 1 is a side elevation; Fig. 2, a plan view, and Fig. 3 a vertical transverse section.

In the drawings, A represents the framework, which is made of one piece of metal bent around and having its ends connected by a cross-bar B, which forms the axial shaft of a large running-wheel C. This wheel is mounted upon one side of the center of the frame and has formed upon its side next to the center a series of cams $a$, of a gradual rise and abrupt descent.

D is the chopper-arm, which is pivoted vertically to the front part of the main frame, so as to vibrate horizontally at its rear end. The middle portion of this chopper-arm is bent toward the wheel and is slotted to embrace the axle, and the rear end of the chopper-arm is adjustably connected to the shank of chopping-hoe E, which latter has a wide curved or angular edge at its lower end adapted to chop laterally to the line of draft. To adapt this hoe to adjustment to various heights its shank is provided with a series of holes $b$. Through two of these holes the ends of a U-shaped bolt $c$ is passed, and upon the opposite side the end $d$ of the chopper-arm is widened vertically and provided with two holes $b'$ $b^2$, spaced the same distance apart as the holes in the hoe-shank, and when the two ends of the U-shaped bolt are passed through two of the holes of the hoe-shank they also pass through the two holes $b'$ $b^2$ of the chopper-arm, and when a nut $e$ is turned tightly up on one or both the ends of the bent bolt the hoe and the chopper-arm are firmly held together by a single fastening and without any loose or pivotal movement.

F is a strong inverted-V-shaped spring, one end of which is made fast to the axle and the other end of which is provided with a ring surrounding the axle and bearing against the chopper-arm to force it against the cam-wheel.

G G are handles whose forward ends are bolted to the main frame and whose rear ends are supported upon standards $G'$ $G'$.

H is a scraper-blade attached to the lower end of a double shank $H'$, which latter is adjustably bolted to the main frame. Now when the machine is drawn forward alongside the row of cotton-plants the scraper in front scrapes the edge of the row, and as the cam-wheel revolves from contact with the ground its cams force the chopper-arm with its hoe laterally away from the wheel until a cam passes the arm, at which moment the spring forces quickly the arm and hoe in the other direction or toward the wheel again, which causes the hoe to chop out a gap in the row of plants, and which series of gaps are repeated at such intervals as to resolve the row into a series of hills. As shown, the chopper and scraper is adapted for operation upon one side of a row of plants; but it is obvious that the scrapers may be duplicated to adapt it to operate upon both sides of a row. I may also dispense with the V-shaped spring and in its place use a spiral spring coiled about the axle.

Having thus described my invention, what I claim as new is—

The combination, with the main frame A, of a running-wheel mounted upon an axial shaft in the rear of the frame and provided with cams on its side, a chopping-arm slotted and embracing the axial shaft and pivoted to the main frame in front, a chopping-hoe attached to said arm in the rear, and a spring for forcing the chopping-arms against the cams, substantially as shown and described.

ALBERT WHITLEY.

Witnesses:
J. H. JONES,
W. C. MILLER.